United States Patent [19]
Ruibal Santome

[11] Patent Number: 5,228,647
[45] Date of Patent: Jul. 20, 1993

[54] AUTOMATIC OPENING, DOSING AND CLOSING VALVE

[75] Inventor: Manuel Ruibal Santome, Vigo, Spain

[73] Assignee: Commercial Vayca, S.L., Vigo, Spain

[21] Appl. No.: 760,834

[22] Filed: Sep. 16, 1991

Related U.S. Application Data

[63] Continuation-in-part of Ser. No. 533,372, Jun. 5, 1990, abandoned.

[30] Foreign Application Priority Data

Jun. 9, 1989 [ES] Spain .................................. 8901892

[51] Int. Cl.⁵ .............................................. F16K 51/00
[52] U.S. Cl. ............................... 251/149.4; 251/149.6; 251/340
[58] Field of Search .......................... 137/515.5, 541; 251/149.4, 149.6, 340

[56] References Cited

U.S. PATENT DOCUMENTS

| | | | |
|---|---|---|---|
| 2,842,382 | 7/1958 | Franck | 251/149.4 |
| 2,995,148 | 8/1961 | Novak | 137/541 X |
| 4,150,809 | 4/1979 | Muller | 251/149.4 |

FOREIGN PATENT DOCUMENTS 570491 12/1957 Italy .................................. 137/541

Primary Examiner—Robert G. Nilson
Attorney, Agent, or Firm—Darby & Darby

[57] ABSTRACT

It consists of a cylindric valve body (1), with a central outer area and two threaded ends. Inside, the body (1) has an annular seat for the cylindric closing valve (2) provided with an O-ring seal (3) for this purpose. The valve (2) is mounted on a bottom guide (7) which closes the body (1) at the bottom and upon which the bottom end of a spring (4) rests with insertion of a self-adjustable ring (5) and an O-ring seal (6.)

3 Claims, 2 Drawing Sheets

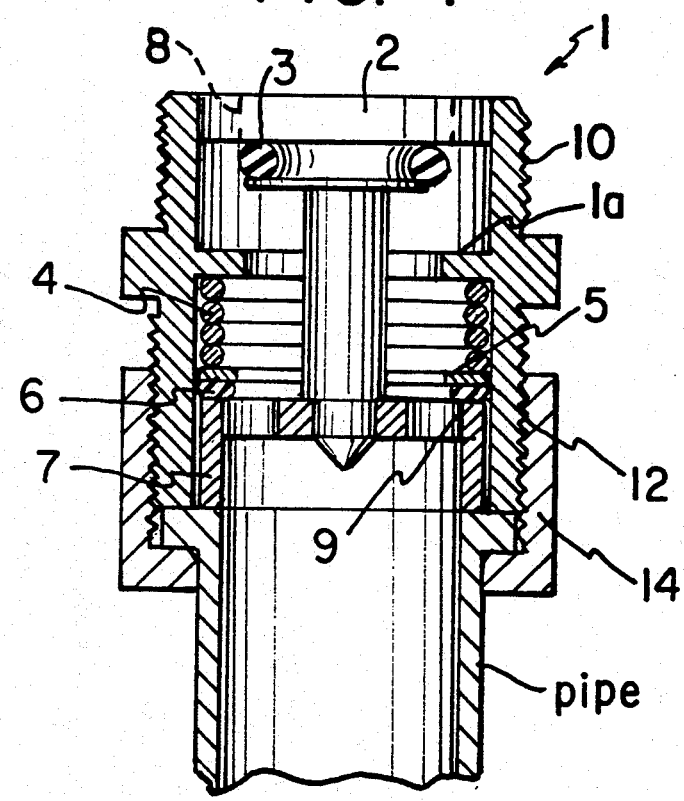
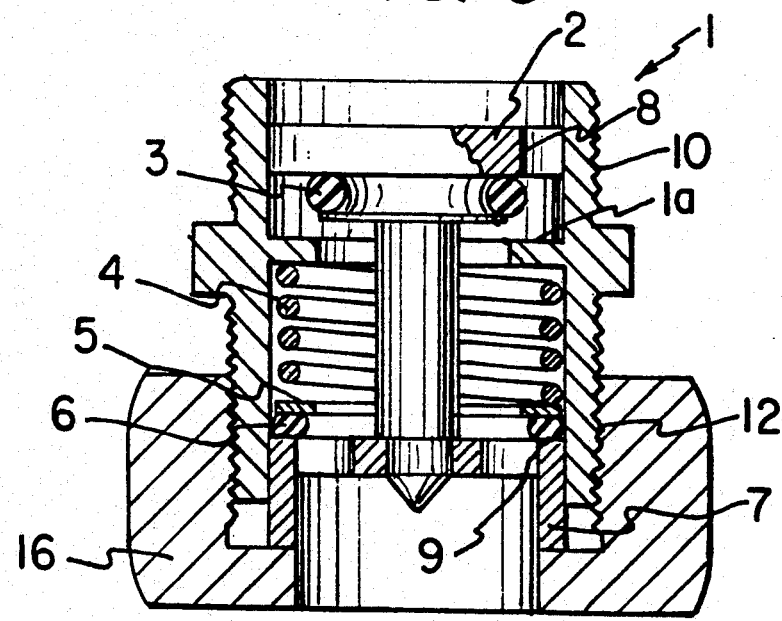

AUTOMATIC OPENING, DOSING AND CLOSING VALVE

This is a continuation-in-part of U.S. application Ser. No. 533,372, filed Jun. 5, 1990, now abandoned.

FIELD OF THE INVENTION

The present invention relates generally to fluid systems and, more particularly, concerns a valve of the type which is placed in-line in a threaded pipe connection to achieve opening/closing and dosing, or flow control, operation.

BACKGROUND OF THE INVENTION

The present invention relates to an automatic opening, dosing and closing valve which offers the novelty and practical usefulness of being conceived and designed for use and assembly of fluid pipe outlets, in general successfully replacing conventional cocks, taps or flow valves. Its advantage is obvious since in the case of a breakdown in the general installation or due to an accidental emergency, it suffices to remove the connector or coupler at the outlet of said valve so that the latter automatically closes the flow of the fluid. Thus, it is possible to repair the breakdown in a clean and safe manner with the advantage that the general installation is not deprived of the fluid supply. The coupler or connector being reconnected at the outlet of the valve, the valve also opens automatically and remains ready for normal service.

It is noteworthy that this valve assembly is cheaper than any conventional tap, providing greater safety and less space.

The valve is formed and integrated by a cylindric body with a central hexagonal shape and ends with outside threads. Inside the device has a cylindric closing valve which effects the sealing with an O-ring seal mounted on said valve. The closing valve is positioned above a compression spring. A self-adjustable ring, an O-ring and a bottom guide plate are positioned underneath the compression spring. The O-ring presses against the inside of the valve body and the guide plate to open or close the valve. The compression spring is capable of sliding within the valve body (2) for pressing against the O-ring.

Having adequately described the invention and for a better understanding of the above and simply as a non-restrictive example this specification is accompanied by a sheet of drawings in a variable scale:

BRIEF DESCRIPTION OF THE DRAWINGS

FIG. 4 is a side sectional view of the valve assembly illustrating a conventional screw-on pipe fitting connected to the lower threads of the body; and FIG. 5 is a side sectional view illustrating how the device may be used on a pipe to achieve continuous control of flow in the manner of a faucet.

DESCRIPTION OF THE PREFERRED EMBODIMENT

Figure 1:
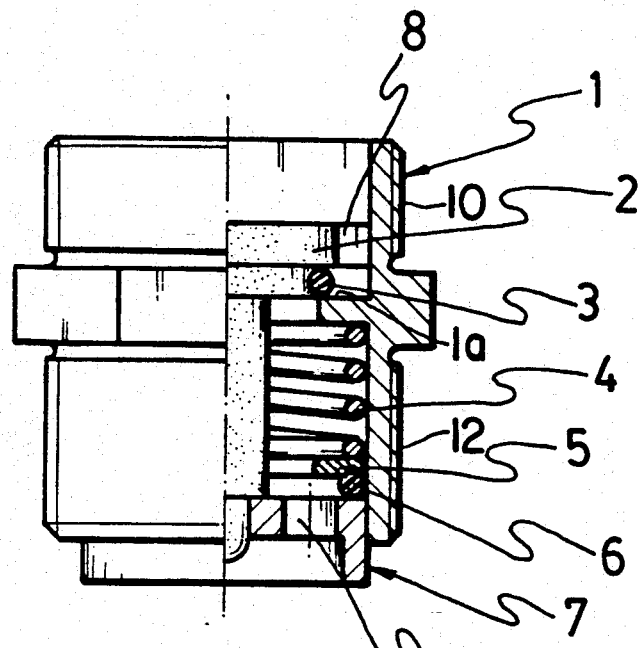
FIG. 1 is a side elevational view of the valve assembly, with half the device shown in longitudinal section to show the arrangement of the inside construction.
Figure 2:
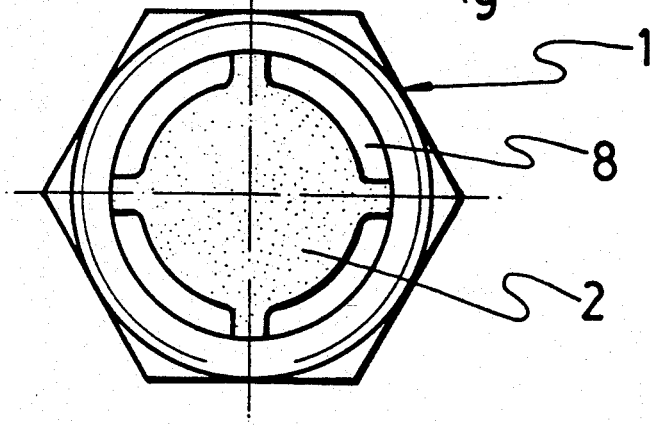
FIG. 2 is a top plan view.
Figure 3:
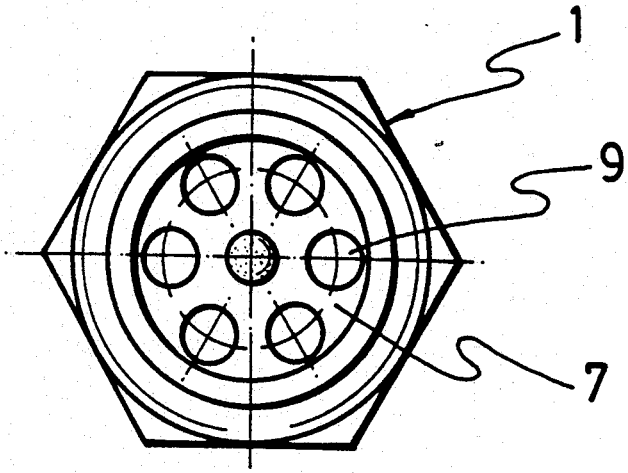
FIG. 3 is a bottom plan view.

The following elements have been indicated in these figures with the references given hereinafter:

1—Valve body
2—Closing valve
3—O-ring seal
4—Compressing spring
5—Self-adjustable ring
6—O-ring seal
7—Bottom guide
8—Top opening passages
9—Bottom opening passages
10—10,12 Exterior threads The automatic opening, dosing and closing valve is formed by a valve body (1) which has outside or external threads 10,12 at either end and houses inside it the closing valve (2), and valve (2) has mounted upon it the O-ring seal (3). O-ring 3 seals against a seating surface 1a provided inside body 1. Valve (2) is mounted on the bottom guide (7) and is biased in a closed position by the spring (4), acting on guide 7 through the self-adjustable ring (5) and the O-ring seal (6). The flow of the fluid occurs through a series of top opening passages (8) in the top part of the closing valve (2) and another series of bottom opening passages (9) in the bottom guide (7.)

FIG. 1 illustrates the valve device embodying the present invention in its unconnected state. In this condition, spring 4 urges bottom guide 7 downward through ring 5 and O-ring 6 and O-ring 3 is pressed against seating surface 1a inside the body 1. Under these circumstances, there is an effective seal between closing valve 2 and seating surface 1a, so there is no flow of fluid through the valve device.

As can be seen in FIG. 4, when a conventional screw-on fluid coupling is connected to the lower threads 12 of the valve device, guide 7 will be urged upward when the pipe fitting 14 is connected, and this will cause O-ring 3 to be raised from seating surface 1a, thereby permitting flow of fluid through the valve device via openings 8 and 9. With the valve device in this open position, O-ring 6 is captured under pressure between ring 5 and guide 7. This deforms the O-ring outwardly, providing an effective seal between guide 7 and body 1, which prevents leakage of fluid therebetween.

As explained above, the present invention has the unique advantage that the water flow is turned off as soon as the pipe fitting 14 is removed. It is therefor possible to work on systems without turning off the main supply of fluid. This is particularly convenient when working on a damaged branch, since the remainder of the system may be kept in operation.

FIG. 5 illustrates how a valve device in accordance with the present invention may be utilized to control fluid flow in the manner of a faucet. It is only necessary to connect the upper threads 10 to a water supply pipe. With no connection made at the lower threads, the valve device provides an effective seal, preventing fluid flow, as explained above. To utilize the device as a fluid flow control valve, it is only necessary to thread a conventional flanged nut 16 onto the lower threads 12. As the nut is advanced upward, O-ring 3 is continuously raised from seating surface 1a, permitting continuous fluid flow rate control. Returning nut 16 to its lowest most position, will return the valve device to its sealed condition.

I claim:

1. A flow valve for controlling the flow of a fluid, comprising:

a valve body having inlet and outlet ends and a flow passage therebetween, said valve body including a sealing surface extending radially from an inner surface of said passage;

a first O-ring positioned adjacent to said first sealing surface;

a cylindrical valve in said passage and positioned adjacent said first O-ring;

a bottom guide plate connected to said cylindrical valve proximate said outlet end;

a spring connected between said guide plate and said valve body, said spring biasing said valve body to press said O-ring and seal said O-ring on said sealing surface, whereby said flow passage is closed;

said valve and said guide plate being displaceable to lift said first O-ring from said sealing surface and open said valve, said spring being compressed when said flow valve is open for fluid flow;

a second O-ring positioned between said spring and said guide plate, said second O-ring being compressed to seal against a surface of said flow passage when said spring is compressed in the open position of said flow valve.

2. A flow valve as in claim 1, wherein said valve and said bottom guide plate include openings for flow of fluid.

3. A flow valve as in claim 1, wherein the quantity of flow through said flow valve is related to the displacement of said valve and bottom guide plate and to the distance said displacement lifts said first O-ring from said sealing surface.

* * * * *